No. 707,169. Patented Aug. 19, 1902.
H. C. SHEARMAN.
SPRING TIRE FOR VEHICLE WHEELS.
(Application filed Aug. 5, 1896.)
(No Model.) 2 Sheets—Sheet 2.

Witnesses:
Socrates Scholfield.
Welcome A. Greene

Inventor:
Henry C. Shearman.

UNITED STATES PATENT OFFICE.

HENRY C. SHEARMAN, OF PROVIDENCE, RHODE ISLAND.

SPRING-TIRE FOR VEHICLE-WHEELS.

SPECIFICATION forming part of Letters Patent No. 707,169, dated August 19, 1902.

Application filed August 5, 1896. Serial No. 601,746. (No model.)

*To all whom it may concern:*

Be it known that I, HENRY CLIFTON SHEARMAN, of the city and county of Providence and State of Rhode Island, have invented certain new and useful Improvements in Spring-Tires for Bicycle and Vehicular Wheels, of which the following is a specification.

My invention consists of a tubular spring-tire composed of one or more series of steel or other spring bands bent in circular or other form and so arranged as to lap joints at edges and so attached to one another as to form a continuous open or close tubular spring-tire of individual spring-bands mutually supporting one another or a tubular spring-tire with telescoping ends, which are provided with a device for drawing and retaining said ends together and also firmly securing tire and cover to rim of bicycle or other class of wheel. The said tubular spring-tire is adapted for the use of a pneumatic tube at discretion; and my invention further consists in providing a cover, a tread-band, permanent or detachable or one permanent and one detachable, and a means for preventing tread-band or cover from slipping on said tire or being severed by transverse cuts; and my invention further consists in providing suitable means for adapting a rim of a wheel for the reception and retention of said tubular spring-tire and cover, all substantially as hereinafter described.

The object of my invention is to provide a substitute for the ordinary pneumatic tire by producing a tubular spring-tire of spring-bands of suitable material which can be made to have more resiliency than the ordinary pneumatic tire by the use of a pneumatic tube without the objectionable feature of liability of puncture, and which tubular spring-tire can be used without a pneumatic tube, although the air-pressure within the tire will serve to tighten the springs and add much to their resiliency. As my invention is not confined to bicycle use, but includes use on heavy as well as light vehicular wheels, I provide a means of using light spring-bands for heavy wheels by using a band along the tread-circumference of said tire to distribute the strain to each spring of the tubular tire. By using an elastic flexible or rigid tread-band the distribution of strain can be varied to suit the conditions of use. As the conditions surrounding the use of the bicycle and intermediate wheels to that of a heavy draft-wheel vary exceedingly, I make use of varying expedients to adapt the tubular spring-tire to its different uses. As the use of the bicycle necessitates a shifting tread-surface of tire, great resiliency, and a jolt-absorbing cover, I retain a rounded outline, together with a pneumatic tube and flexible or elastic cover. For light and heavy wheels, two of which travel on same axle, presenting same tread surface to road contact, I provide a tire with stiffer springs, which may be reinforced by one or more series of leaves, and I provide means for varying the distribution of weight and strain to all of the springs by incurving the springs at the tread-circumference, which incurving has these advantages: it stiffens the springs at tread, it furnishes a firm support for tread-band whether flexible or rigid, it lessens lateral motion, it gives additional springing quality to the spring-bands, it furnishes a grip on tread-band or cover at time and place most desirable, it prevents cutting through of tread-band or cover, or, if it were possible to cut it through transversely, it would by its tight grip prevent the cut widening and so ruining the cover when the wheel is speeded to its utmost, it furnishes the means for using a detachable tread-band which will take the wear and tear of road contact, and it enables a continuous cover open at tread-circumference to be used with the tubular spring-tire provided with the bevel-gear device, which device enables the tire to be readily adjusted to and removed from the rim of the wheel, and also firmly secures tire and cover to the rim of wheel and prevents creeping of tire or cover either laterally or longitudinally.

*Description of Drawings.*

Fig. 2 is a longitudinal sectional view of close tire (with pneumatic tube omitted) attached to rim of wheel at line 3 4, Fig.

1, showing method of attaching ends of tire and securing tire to rim of wheel. Fig. 15 represents a perspective view of a segmental portion of tread-band Q, forming a cushion-packing of spring-leaf. Fig. 16 represents a cross-sectional perspective view of lining springs or leaves of tread-band (portion 6 6 of Fig. 10) in place and shows one abutting series along the tongue and two series overlapping elsewhere. Fig. 17 represents a side view of a segment of tire, showing telescoping inner circular band. Fig. 18 represents a cross-section of an open tire, both outer and inner bands being of circular form with layer of flexible and elastic material between.

In the drawings, $a$ represents the outer and $a'$ the inner spring-band, while $a^2$ is the telescoping spring-band at end of tire.

B is the wheel-rim, and $b$ is the flexible packing between series $a$ and $a'$.

$c$ is the covering of the tubular spring-tire.

$d$ is the assembling rim-band, on which the springs are assembled.

$e$ is the nut engaging the bevel-gearing, which nut is made in same piece with the guiding extension end plate of the assembling rim-band in the close tire and detachable from it in the open tire by means of dovetailing $s\ s$.

$f$ is the threaded shaft of bevel-gearing, which engages the nut $e$ and is operated by turning thumb-piece $n$, which is slotted and shouldered onto $h$, the hollow perpendicular shaft of bevel-gearing, and is held in place by $m$, a set-screw. The bevel-gearing is housed on all sides by boxing $t$, which furnishes a bearing for gear and shafts, and is made separable from rim and tire and is held in place on the rim B by being sunk slightly below level of groove or grooves in the bed of rim and through which rim the hollow perpendicular shaft $h$ of gearing passes.

$g$ is the valve-stem of $j$, the pneumatic tube, and $l$ its cap.

$o\ o$ are the guiding-arms to which the spring-bands intercepted by the boxing $t$ are attached and which support and guide the springs between boxing $t$ and rim B and are held firmly in position by overlapping sides of top of gear-boxing $t$.

Figures 3, 4, 5, 6, 7, 8, 9:
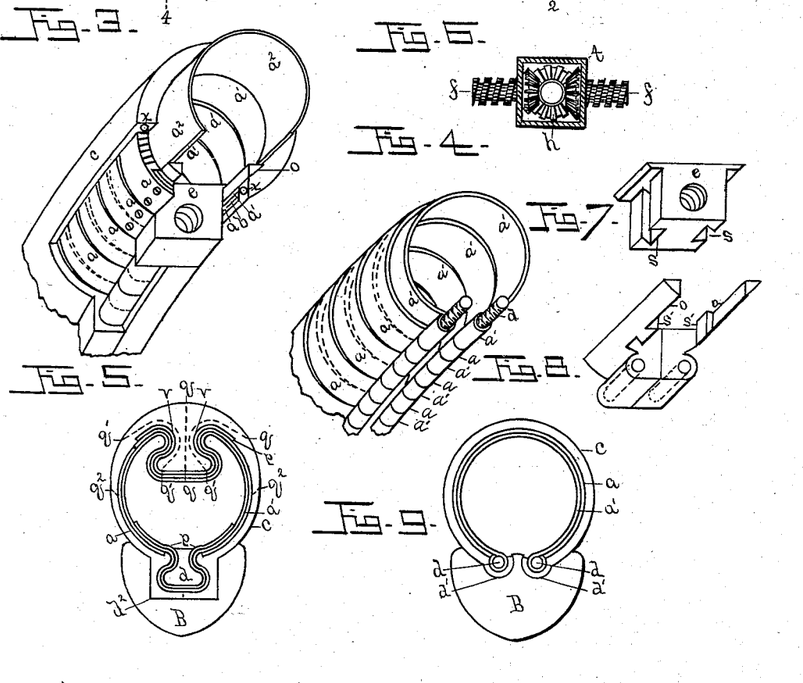
Fig. 3 shows a detailed perspective view of telescoping end of close tire with part of cover cut away.
Fig. 4 is a perspective view of open tire, showing arrangement of spring-bands and threaded ends of assembling rim-bands.
Fig. 5 is a section of close tire in place on rim, showing a recurvature of spring-bands along tread-circumference to retain a tread-band, and dotted lines show a difference in method of making tread-band a part of cover and detachable from it. It also shows a groove along the center of rim-bed to prevent lateral movement of tire on rim.
Fig. 6 shows a view of bevel-gearing from above, the top plate of boxing being removed.
Fig. 7 shows an under perspective view of the detachable nut which engages the threaded shaft of bevel-gears in an open tire and is dovetailed onto the extension-arms of end plates.
Fig. 8 shows an under perspective view of the end plates, bearing extension guiding-arms of open tire, showing method of attachment to ends of assembling rim-bands and engagement with detachable nut.
Fig. 9 shows a section of rim of wheel provided with two grooves for the reception of the edges of open tire, together with open tire and cover in place on said rim.
Figure 10:
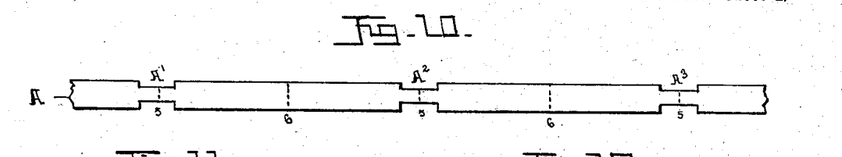
Fig. 10 represents the surface of a fragmental strip of the material of which the springs of the tire are formed, showing the method of producing a shouldered portion on either or both edges of strip, the dotted lines 5 5 and 6 6 indicating points at which severance can be effected to produce individual springs possessing this feature.
Figure 11:
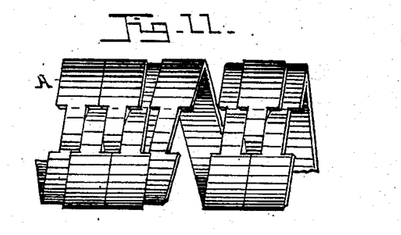
Fig. 11 represents a flexible cylinder formed of interlocking loops of a single band with the coil separated to show the method of overlapping alternate loops by intermediate ones to form two series.
Figure 12:
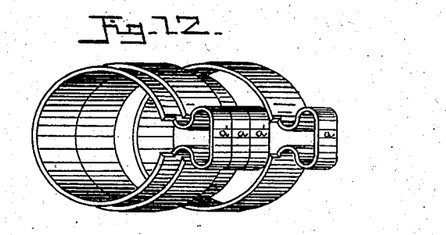
Fig. 12 represents a flexible cylinder formed of interlocking annular bands, which may be portions 5 5 or 6 6 of Fig. 10, with united ends. It illustrates the method of interlocking a series of annular springs by causing alternate springs to overlap intermediate ones and form two series, and by a recurvature of the springs in the same direction at their narrow portion shows their adaptability to grasp an assembling-band.
Figure 13:
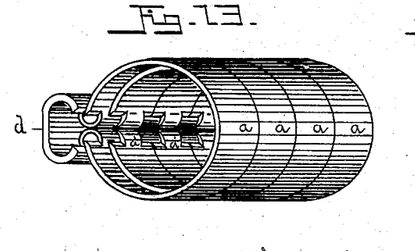
Fig. 13 represents an interior view of a flexible cylinder formed of a series of individual springs (portion 5 5 of Fig. 10) with ends curved and attached to an assembling-band. It shows the interlocking and overlapping and the abutting of springs along the assembling-band.
Figure 14:
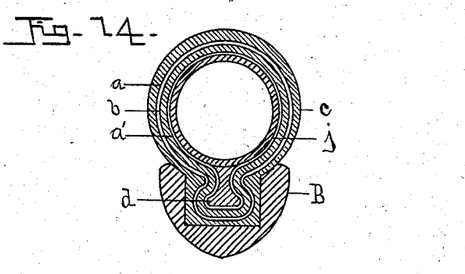
Fig. 14 represents a cross-section of the tire shown in Figs. 1, 2, 3 at a point beyond adjustable end plate.
Figures 15, 16, 17, 18:
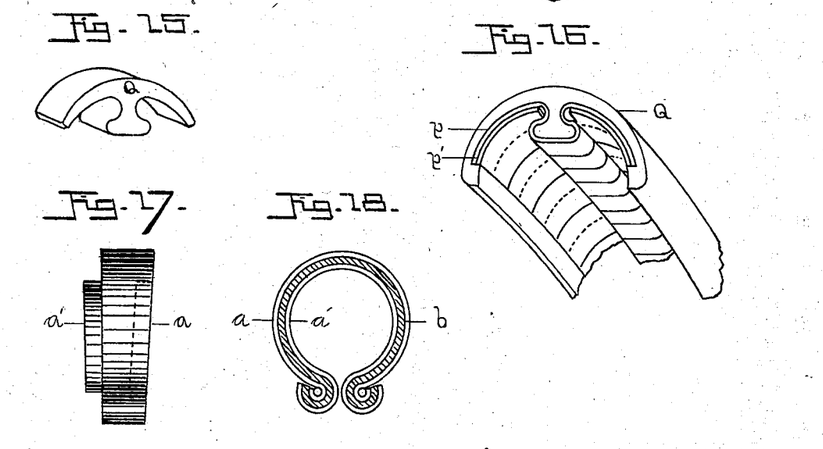

$p$, as shown in Fig. 5, is a series of reinforcing springs or leaves at rim and tread circumference of tire.

$q\ q'\ q^2$ represent boundaries of the tread-band, which may be a part of cover or detachable from both cover and tire and may be used to hold the edges of tire-cover opening at tread-circumference in place between $v\ v$, the throat of the recurved recess.

$d'\ d'$ are the grooves in rim for the reception of $d\ d$, the assembling rim-bands of open tire, together with cover, and $d^2$ the groove on rim for assembling-band of close tire and cover.

*Detailed Description of Invention.*

The springs $a$ and $a'$ may have their ends fastened together, forming individual annular bands, or attached to a longitudinal assembling-band at either tread or rim circumference of tire, forming a close tire. In case of an open tire each end is attached to a separate assembling-band. The spring-bands may be circular in form or bent in any desirable shape.

I prefer to make the tubular spring-tire separable in all its parts, and to accomplish that result in case of a close tire I bend the spring-bands to form a recess which may open either within or without along either rim or tread circumference or both rim and tread may be so provided. This recess along the interior forms a projection on exterior, and vice versa. I prefer to recurve said recess, making its interior wider than its mouth or throat, thus providing a firm bearing for the rim and tread bands on each spring of the tubular tire. In Fig. 4 the assembling rim-bands pass through the turned-over ends of the springs, thus making the springs easily separable. The spring-bands may have parallel edges, or their edges may be curved to allow of adjacent ones being in approximate contact throughout their entire length. They may overlap in same series or be overlapped by bands of another series or in any other suitable way. They may have a piece cut out near line of contact with assembling-band, forming a shoulder on either edge, allowing all alternate springs to form a series of springs edge to edge, their edges covered by the intermediate springs, the shoulder preventing the tendency of the springs to move in pairs. Besides having a curved edge the spring-bands may have their surface swaged into curvatures to correspond to the natural curvatures of the tire. To further stiffen the springs and increase the resiliency of the tire, a layer of suitable flexible material may be placed between two series of springs or firmly bound about the tire. The material may consist of a textile fabric, strands of fiber, or wire running longitudinally around the tire at the tread, or the material may completely surround the tire and be provided with a waterproof coating.

The ends of the tire may be permanently united or left to telescope within a continuous cover. I prefer to provide the bevel-gear screws shown in Figs. 1, 2, 3, engaging the nut $e$, Figs. 2, 3, 7, previously described. This device is made separable from both rim and tire, although it may be permanently attached to either. The perpendicular shaft may be made hollow or solid and may be turned by thumb-piece or wrench. There may be a loose bevel-gear on top plate of boxing to steady the gearing. The boxing may be placed within the ends of tire or otherwise than as shown in drawings. The ends of tire on being drawn together may be fastened at tread by a screw or other device, if desired. The telescoping spring-band may be $a'$, passing within $a$ of opposite end, or it may be $a^2$, slitted along edge of $a'$ and turned inward and longitudinally outward to engage within $a'$ of opposite end of tire, as shown in Fig. 2. The slitting may be carried to either edge of $a^2$, if desired, the object being to retain the springing quality as much as possible. The springs are kept securely in place by the end plate or plates, to which are attached arms $o\ o$ and nut $e$ and which are screwed or otherwise fastened to assembling rim band or bands.

The open tire (represented in Fig. 4) is designed to inclose a continuous pneumatic tube, the valve-stem of which may pass through the rim of wheel at any desired spot. I prefer it should pass through the hollow thumb-shaft.

Figure 1:
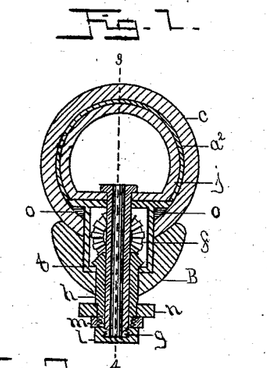
Figure 1 represents a cross-section of telescoping end of tubular spring-tire in place on rim of wheel through center of bevel-gear boxing at line 1 2, Fig. 2, showing pneumatic tube with valve-stem passing through thumb-gear shaft.
Figure 2:
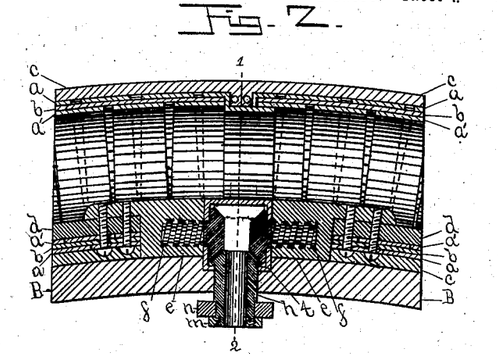

The close tire, Figs. 1, 2, 3, may be used with pneumatic tube sealed at both ends. I prefer same disposition of valve-stem.

The tire represented in section, Fig. 5, is designed for use without a pneumatic tube, or for wheels sustaining a greater weight than bicycle-wheels, or where tread contact with road-bed is uniform, or where motive power is applied to wheel or tire. It illustrates the features of a recurved recess along the tread-circumference of tire, whereby a tread-band of elastic, flexible, or rigid material can be used to distribute the strain on tire in contact with road to all the springs composing the tire. This distribution depending in degree on the material of tread-band said material may be varied to suit conditions. The recess along the tread will allow of tread-band being detachable from tire, and its recurvature will cause its throat at $v\ v$ to contract about the detachable tread-band at time and place of contact with road. I make use of this fact by making tread-band a part of the tire-cover or as a means of holding edges of cover in place when cover is open along tread-circumference by acting as a packing between them and by extending the edges of detachable tread-band laterally allow the tread-band to take all the wear and tear of road contact, thus protecting the tire-cover.

The tire-cover may conform to the curves of the outer surface of the tubular spring-tire and have a varying thickness of material and suitable surface outline when covering recesses or projections along the rim and tread circumferences, and the said cover may curl around the rim-bands or the throat of the recurved recess when open along the tread or rim circumference, and it may have a suitable thickened shoulder at ends when the bevel-gear device is used, which shoulder may be formed about a spring-band to hold the ends firmly in place over the slight shoulder of the telescoping bands.

The edges of the open tire covered by those of its cover may abut together in the central groove in rim of wheel, which is made for the projecting tongue of the close tire along its rim-circumference, or said edges may with those of cover have a separate groove for each edge prepared for their reception in the rim of wheel, and the rim may be furnished with a well or depression sunk in the center and below the bed of rim, together with an opening through the rim to admit the passage of the valve-stem and thumb-piece shaft hereinbefore described.

It is obvious that as the primary object of my invention is to provide a sectional tire of readily-removable springs the springs may consist of simple bands of homogeneous material or of segmental portions of the tire composed of a union of adjacent and opposite bands or of such bands with a flexible and elastic material between, forming a compound spring of differing material possessing the requisite springing quality and such features of the simple spring-bands as relate to their attachment overlapping and abutting.

What I claim as my invention, and what I wish to secure by Letters Patent, is—

1. In combination, a wheel-rim having one central or two parallel grooves along its bed; a depression or well sunk below the surface of said bed of rim with an opening passing through the center of said depression; a tubular-tire or pneumatic-tube cover; and a boxing, occupying said depression or well in said rim, having a perpendicular shaft passing through said opening, said shaft having a bevel-gear head gearing with two bevel-gear-headed screws, threaded alike, passing through opposite sides of boxing for the purpose of closing the telescoping ends of the tire or pneumatic-tube cover with which ends said screws engage, substantially as described.

2. A flexible outer cover for a tubular-spring-tire or pneumatic-tire tube with ends, having the same outer periphery, provided with inwardly-projecting and transversely-extending shoulders forming flanges adapted to abut continuously together without overlapping, substantially as shown and described.

3. A flexible outer cover for a tubular-spring-tire or pneumatic-tire tube with ends, having the same outer periphery provided with inwardly-projecting and transversely-extending shoulders forming flanges adapted to abut continuously together having embedded in, or made integral with, each of said ends a transverse band of spring-wire or suitable non-stretching material, substantially as described.

4. In combination with a detachable tubular spring-tire constructed of bands of spring material, a cover with its ends having the same outer periphery, adapted to abut together continuously over a telescoping spring-band, made an integral part of one end of the tire, to guide the opposite end of the tire-cover to its place of continuous abutting contact transversely over said telescoping spring-band when the tire is adjusted onto the rim of a wheel, and provided with suitable means for closing and fastening the same while on the rim of a wheel, substantially as described.

5. In combination with a tubular spring or other tire or flexible outer cover for a pneumatic-tire tube with free ends, having the same periphery, a rim-retaining band, or bands, extending around the longitudinal circumference of tire provided with a flexible band with ends secured at an extremity of said retaining band, or bands, and extending within and around the transverse end of tire to which it is attached, and projecting from said end to guide the opposite end of said tire or pneumatic-tire cover to its continuous transverse abutting contact over said flexible band in the adjustment of said tire to the rim of a wheel; the ends of said retaining band, or bands, being secured to the ends of said tire or pneumatic-tube cover, substantially as described.

6. In combination with a tubular spring or other tire or outer flexible cover for a pneumatic-tire tube with free ends, having the same outer periphery, a rim-retaining band, or bands, extending around the longitudinal circumference of tire, provided with a flexible band attached to each extremity of said retaining band, or bands, one being of such larger dimensions as to allow the other transverse band to telescope within it, and the ends of said tire, or cover, to which said ends of retaining band, or bands, together with their transverse bands are secured, to abut continuously over the aforesaid telescoping band, substantially as described.

7. In combination with a tubular spring or other tire, or flexible outer cover for a pneumatic-tire tube with free ends, having the same outer periphery, a rim-retaining band, or bands, extending longitudinally around said tire, provided with adjusting end plates screwed, or otherwise fastened, to the ends of said retaining band, or bands, to regulate its length; which end plates are provided with a flexible band conforming to the transverse curve of ends of tire, or tire-cover, one of which transverse bands being of such lesser diameter as to allow it to telescope within the other and the free ends of tire, or tire-cover, with same outer periphery to which said transverse bands are secured to abut continuously over the said telescoping band; said end plates being furnished with any suitable device to secure them together, substantially as described.

8. In a pneumatic tire, the combination of an outer flexible cover having free ends of the same outer periphery adapted to abut over a flexible transverse band attached to, or an integral part of, one end of cover; a longitudinally-extending rim-retaining band, or bands, with ends secured to ends of said outer cover; an inflatable inner tube; and suitable means for securing the ends of said retaining-band together, substantially as described.

9. A flexible or hollow tire with ends adapted to telescope together by abutting over or under a telescoping spring-band, and provided with a bevel-gear device consisting of a bevel-gear shaft gearing with two bevel-gear-headed screws which engage with the ends of the tire for the purpose of drawing and holding the ends together, substantially as described.

10. A tubular spring-tire constructed of bands of spring metal, or other suitable material, attached to an assembling rim band, or bands, with ends of said tire adapted to telescope by abutting over a telescoping spring-band, and provided with a bevel-gear attachment whereby the ends of the tire are drawn together or forced apart by the action of a bevel-gear shaft gearing with two bevel-gear-headed screws, threaded alike, which engage with the ends of the tubular spring-tire, substantially as described.

11. A flexible cover for a pneumatic tube, or tire, with ends adapted to telescope together by abutting over a telescoping spring-band, and provided with a rim band, or bands, and a bevel-gear attachment whereby the ends of cover are drawn together or forced apart by the action of a bevel-gear shaft gearing with two bevel-gear-headed screws, threaded alike, which engage with the ends of the rim band, or bands, substantially as described.

12. A tubular spring or other tire made attachable to, and detachable from, the rim of a wheel by means of a bevel-gear device consisting of a bevel-gear shaft gearing with two bevel-gear-headed screws which engage with the abutting ends of the tire, said ends abutting over a flexible band, and cause said ends to approach or recede from each other and also hold said ends firmly together over the said band by the turning of said bevel-gear shaft, substantially as described.

13. A tubular spring or other tire made attachable to and detachable from the rim of a wheel by means of a bevel-gear device consisting of a bevel-gear shaft gearing with two bevel-gear-headed screws which engage with the abutting ends of the tire and cause them to approach or recede from each other and also hold said ends firmly together by the turning of said bevel-gear shaft, substantially as described.

14. A detachable bevel-gear device for closing the ends of a tire, or other purpose, consisting of a boxing inclosed within which are geared three bevel-gear-headed shafts, two of which pass through opposite sides of boxing which furnishes a bearing for their bevel-gear heads; the external portion of each of the two separate shafts is threaded the same; the third bevel-gear has a solid or hollow shaft that, passing through an intervening side of the boxing, is provided with a thumb-piece or wrench which revolves the bevel-gear-headed screws, and will cause nuts, or other similarly-threaded objects, engaged one on each of said bevel-gear-headed screws to simultaneously approach toward, or recede from, the boxing, substantially as described.

15. In combination, a bevel-gear device consisting of a boxing inclosed within which are geared three bevel-gear-headed shafts, two of which pass through opposite sides of boxing which furnishes a bearing for their bevel-gear heads, the external portion of each of the two separate shafts is threaded the same, the third bevel-gear has a hollow or solid shaft that, passing through an intervening side of the boxing, is provided with thumb-piece or wrench, a nut carrying two longitudinally-extending guiding-arms engaged on each screw-threaded bevel-gear shaft, the extension guiding-arms of each nut sliding along the opposite sides of the boxing as the nuts approach or recede from each other by the turning of the bevel-gear-operating shaft, substantially as described.

16. The combination of the bevel-gear device consisting of a boxing inclosed within which are geared three bevel-gear-headed shafts, two of which pass through opposite sides of boxing which furnishes a bearing for their bevel-gear heads, the external portion of each of the two separable shafts is threaded the same, the third bevel-gear has a hollow shaft that, passing through an intervening side of the boxing, is provided with a thumb-piece or wrench, and a valve-stem of an inner pneumatic tube passing through said thumb-shaft: which combination allows the said thumb-shaft or operating-shaft to be revolved around said valve-stem without interfering with its functions, substantially as described.

17. A detachable tubular spring-tire consisting in combination of two series of spring-bands of metal or other suitable material, of circular or other form; said spring-bands to be placed at right angles to the plane of the tire and so adjusted and attached together that they lap edges and mutually support one another by interlocking in the same series; the spring-bands of the inner series being assembled on a rim-retaining band to form a close series; the spring-bands of the outer series having the corners of each end cut out to form a shoulder, and each of said ends attached to a separate assembling rim-band forming an open series of springs with edges below the shoulder abutting along the assembling rim-bands but with edges being overlapped and interlocked along the curvature of the springs; said outer open series closing over and clasping the inner series along its rim-assembling band and made attachable to and separable from it; together with a cover of canvas, rubber or other suitable material inclosing said tire, substantially as described.

18. A detachable tubular spring-tire constructed of two series of annular spring-bands, of metal or other suitable material, bent in circular or other form, placed at right angles to the plane of the tire; the edges of the spring-bands of the inner series being overlapped by the spring-bands of the outer series, causing them to mutually support one another, and both series attached to an assembling rim-band along the inner, or rim, circumference of tire with edges of springs in each series abutting along said assembling-band but only approximately abutting elsewhere along the transverse curve of tire to allow of a slight interplay of springs at tread when yielding to road contact, substantially as described.

19. A detachable tubular spring-tire constructed of two series of separate spring-bands, of metal or other suitable material, bent in circular or other form, placed at right angles to the plane of the tire; the edges of the spring-bands of the inner series being overlapped by the spring-bands of the outer series causing them to mutually support one another; the ends of the spring-bands being attached to separate assembling rim-bands with their edges abutting along said assembling rim-bands in each series to form a tire continuously open along its rim-circumference, substantially as described.

20. In a tubular spring-tire, a series of spring bands, or loops, with their edges abutting along the lesser rim-circumference of tire but overlapping edges along the transverse curve of tire—due to the width of each spring, or loop, being less at the place of their abutting contact with adjacent ones along the rim-circumference of tire than the remaining wider and shouldered portion of each spring, or loop; which overlapping of shouldered portion may extend sufficiently to cause the edges of alternate springs to approximately meet and form two series elsewhere than at place of abutting contact along the rim-circumference of tire, substantially as described.

21. A tubular spring-tire constructed of a series of spring bands, or loops, of metal or other suitable material, of circular or other form, attached to an assembling band, or bands, in such manner that said spring bands, or loops, abut along the said assembling band, or bands, but overlap edges along the transverse curve of tire—due to the width of each spring band, or loop, being less at place of attachment to said assembling band, or bands, than the remaining shouldered portion of each spring band, or loop, substantially as described.

22. A tubular spring-tire consisting of a series of spring-bands of metal, or other suitable material, of circular or other form attached to an assembling band or bands in such manner that said spring-bands abut along the said assembling band or bands but overlap edges along the transverse curve of tire—due to the width of each spring being less at place of attachment to said assembling band or bands than the remaining shouldered portion of each spring; which overlapping may extend sufficiently to cause the edges of alternate springs to approximately meet and form a series overlapped by intermediate springs elsewhere than at place of attachment to said assembling band or bands, substantially as described.

23. A tubular spring-tire consisting of a series of spring bands, or loops, of metal or other suitable material, of circular or other form, attached to an assembling band, or bands, by such a curvature of the springs, or loops, as will cause them to firmly clasp said assembling band, or bands, and secure such an interlocking of individual springs by means of each spring abutting against adjacent ones along the said assembling band, or bands, but overlapping edges along the transverse curve of tire—due to the width of each spring, or loop, being less at place of attachment to said assembling band, or bands, than the remaining shouldered portion of each spring, or loop; together with an adjusting end plate screwed or otherwise fastened to the ends of said assembling-band to regulate its length and secure the abutting contact of the spring-bands, substantially as described.

24. A tubular spring-tire consisting of a series of spring bands, or loops, of metal or other suitable material, of circular or other form, removably attached to an assembling band, or bands, by such a curvature of the springs, or loops, as will cause them to firmly clasp said assembling band, or bands, and secure such an interlocking of individual springs, or loops, by means of each spring, or loop, abutting against adjacent ones along the assembling band, or bands, but overlapping edges along the transverse curve of tire—due to the width of each spring, or loop, being less at place of attachment to said assembling band, or bands, than the remaining shouldered portion of each spring, or loop; which overlapping of shouldered portion may extend sufficiently to cause the edges of alternate springs to approximately meet and form two series of springs elsewhere than at place of attachment to said assembling band, or bands, substantially as described.

25. In a tubular spring-tire, the combination of one or more series of springs with two assembling-bands; the springs to be removably attached to said assembling-bands by curving the ends of each spring so that they will firmly clasp, by approximately surrounding, said assembling-bands and allow each spring of a series to be moved along said assembling-bands in its attachment to, and removal from, them, substantially as described.

26. In a tubular spring-tire, the combination of two overlapping series of springs with two assembling-bands; the springs to be removably attached to said assembling-bands by curving the ends of each spring so that they will firmly clasp, by approximately surrounding, said assembling-bands and allow each spring of a series to be moved along said assembling-bands in its attachment to, and removal from, them, substantially as described.

27. In a tubular spring-tire, the combination of one or more series of springs with an assembling-band; the springs to be removably attached to said assembling-band by a recurvature of the springs at the place of attachment enabling them to partially surround and firmly clasp it, and allow said tire to be adjusted to and removed from the rim of a wheel without disturbing the attachment of springs to their assembling-band, substantially as described.

28. In a tubular spring-tire closed along its rim-circumference, the combination of one or more series of springs, or spring-loops, with one assembling-band; the springs to be removably attached to said assembling-band by a recurvature of the springs at the place of attachment enabling them to partially surround and firmly clasp it, and allow said tire to be adjusted to and removed from the rim of a wheel without disturbing the attachment of springs to their assembling-band, substantially as described.

29. In a tubular spring-tire, the combination of an assembling band, or bands, on which the removable springs of a tire are assembled, together with an end plate screwed, or otherwise adjustably fastened, to each end of the assembling band, or bands, to secure the abutting contact of the springs along the said assembling band, or bands, substantially as described.

30. In a tubular spring-tire, or covering for a pneumatic-tire tube composed of overlapping sections, a tubular spring or section of said tire or covering provided with one or two recesses formed by curvatures in its material such as will enable it to firmly clasp an assembling band, or bands; the width of material being less at said curvature than remaining portion of said spring or section—due to the removal of material along one or both edges to form a shoulder, substantially as, and for the purposes described.

31. A tubular spring-tire constructed of two or more series of spring bands, or loops, having a layer of suitable flexible material between two series of said bands or loops of said tire; which material may be confined to the tread-circumference of tire or extend laterally around it, substantially as, and for the purposes described.

32. A flexible cylinder for a wheel-tire, or other purpose, consisting of a series of annular bands, or loops, which are provided with a recurvature of transverse outline and which are of such lesser width at said recurvature as will allow said bands or loops to abut at said recurvature and interlock by overlapping transversely elsewhere, substantially as shown and described.

33. In a tubular spring-tire, or covering for a pneumatic-tire tube, made up of adjustable parts, a segmental portion of said tire or covering consisting of an outer and an inner transverse band with a layer of flexible and elastic material between, an edge or edges of either band of said segmental portion projecting beyond edge or edges of other band to form a telescoping band adapted to lap the edge of an adjacent segment, substantially as shown and described.

34. In combination with a tubular spring or other tire having a recurved recess along the tread-circumference of said tire, a cover with edges calculated to turn into and hug the sides of the said recurved recess, a tread-band having laterally-extending wings lapping over approximate edges of cover, said tread-band to be separable from said cover and calculated to hold said edges of cover firmly in place in the recurved recess along tread-circumference of tire and also to keep the wear and tear of road from said cover, substantially as described.

35. A tubular spring-tire in combination with a cover open along the tread and a detachable tread-band constructed to fit into a recurved recess along the tread of the tubular spring-tire and hold in place the edges of the said tire-cover, substantially as described.

36. In combination with a tubular spring or other tire having a recess along its tread-circumference, a cover consisting of two separate longitudinal parts—the outer edges of which are calculated to turn into and hug the sides of the said recess, the flanking portions of cover extending to any desired limit, together with a tread-band occupying the space between the approximate outer edges of cover within said recess to hold them in place, substantially as described.

37. In combination with a tubular spring or other tire or covering for a pneumatic tube having its outer transverse unbroken contour recurved to form a recess or groove longitudinally extending along its tread, which recess or groove shall have its side walls recurved to form a throat at tread narrower than interior of said recess or groove, at tread-band, occupying such recess or groove and firmly clasped by its walls, with laterally-extending wings which hug the curves of said tire both laterally and longitudinally and which may extend laterally to any desirable extent—even to meeting below said tire, substantially as shown and described.

38. In combination with a detachable tread-band, a tubular spring-tire constructed of one or more series of independently-acting and overlapping springs attached along the smaller longitudinal circumference of tire to a rim-retaining band, or bands, calculated to bind the springs of the tire to the rim of a wheel; said tire having a ℧-shaped recess along its tread-circumference with its side walls formed by such a recurvature in the body of each spring as to produce a throat at tread narrower than the interior of said recess to adapt it to hold securely in place by lateral or longitudinal pressure said detachable tread-band, substantially as described.

39. In combination with a tubular spring, or other, tire having a recess along its tread-circumference so recurved in sectional outline as to form a throat at tread narrower than the interior of said recess, a cover continuously open along the tread to admit of the insertion of the tire, and with its free edges calculated to turn into and occupy said recess, substantially as described.

40. A tire constructed of one or more series of independently-acting and overlapping springs attached along the smaller longitudinal circumference of tire to a rim-retaining band, or bands, calculated to bind the springs of the tire to the rim of a wheel; said tire having a ʊS-shaped recess along its tread-circumference with its side walls formed by such a recurvature in the body of each spring as to produce a throat at tread narrower than the interior of said recess, substantially as and for the purposes described.

41. In combination with an inner pneumatic tube, a tubular spring-tire constructed of two series of independently-acting springs so arranged and attached to an assembling rim band, or bands, that the edges of the springs of a series are overlapped by the springs of the same or the other series; the springs of the outer series being so incurved and recurved at the tread of the complete tire as to form a continuous ʊS-shaped recess along the tread-circumference of tire; the springs of the inner series not being recurved at the tread but calculated to confine the pressure of the inner pneumatic tube and allow the recurved recess of the outer series to perform its peculiar functions apart from, and independently of, any pressure derived from the inner pneumatic tube, substantially as described.

42. In combination, a tubular spring-tire constructed of independently-acting springs attached to a retaining band, or bands, calculated to bind the tire to the rim of a wheel, said tire having a recess along the tread-circumference formed by such a recurvature in the body of each spring as to form a throat at tread narrower than the interior of said recess; an inner flexible but non-stretchable membrane, of circular transverse section, attached to said rim-retaining band, or bands, together with an inner inflatable pneumatic tube, substantially as described.

43. In combination with a tubular spring, or other flexible and elastic, tire or outer cover for an inner pneumatic-tire tube, having a ʊS-shaped recess along its tread-circumference formed by a depression or groove in the material of said tire or outer cover, which recess by a recurvature of its side walls has a throat at tread narrower than the interior of said recess; a detachable tread-band occupying said recess with laterally-extending wings which hug the curves of said tire both laterally and longitudinally, which wings may extend to any desirable extent around the transverse curve of tire, substantially as described.

44. A tubular spring or other tire or covering for a pneumatic-tire tube having its outer transverse unbroken contour recurved to form a recess or groove longitudinally extending along its tread, which recess or groove shall have its side walls recurved to form a throat at tread narrower than interior of said recess, substantially as shown and described.

45. In a tubular spring-tire, or covering for a pneumatic-tire tube made up of adjustable parts, a spring or segmental portion of said tire or covering having its outer transverse unbroken contour recurved to form a recess or groove longitudinally extending along its tread, which recess or groove shall have its side walls recurved to form a throat at tread narrower than interior of said recess, substantially as shown and described.

46. A detachable tread-band or tire-cover having an inwardly-projecting longitudinal ʊS-shaped tongue with recurved sides caused by a thickening of its solid material along its inner or lesser longitudinal periphery, and laterally-extending wings which following a curve in section may extend sufficiently to meet and form a cover open along its inner longitudinal circumference, substantially as, and for the purposes described.

47. In a sectional cover, for a tubular spring or other tire, provided with an inwardly-projecting longitudinal tongue with recurved sides caused by a thickening of its solid material along its inner or lesser longitudinal periphery and laterally - extending wings which following a curve in section may extend sufficiently to meet, a section comprising a longitudinal half of said cover, substantially as shown and described.

48. The combination of a detachable tread-band, or tire-cover, having an inwardly-projecting longitudinal tongue, with a thickened periphery along its inner tread-circumference, and a series of transverse spring bands or leaves curved to clasp said tongue with edges abutting along said tongue but owing to a lesser width at abutting middle portion of each spring the remaining shouldered portions are caused to overlap edges of adjacent springs or leaves forming a flexible spring-lining to the inner surface of said tread-band or cover, substantially as described.

49. The combination of a tread-band, or tire-cover, provided with a longitudinal tongue inwardly projecting from its inner tread-circumference and one or more series of laterally-extending springs or spring-leaves adjustably attached to said tongue by means of a recurvature in the body of each spring enabling it to firmly clasp said tongue and allow of an interplay of the ends of springs either laterally or longitudinally, substantially as described.

50. A detachable, puncture-proof tread-band composed of one or more series of spring-leaves having a recurved recess at their middle portion occupied by the recurved inwardly-projecting tongue of its cushion-packing which is made integral with or detachable from it, substantially as shown and described.

51. In a detachable, sectional tread-band provided with laterally-extending wings and a recurved inwardly-projecting longitudinal tongue, the combination of a segmental portion of said tread-band with a recurved spring-leaf, made integral with it or detachable from it, to form a puncture-proof section; which spring-leaf may project longitudinally if desired, to adapt it to overlap an adjacent section, substantially as shown and described.

52. Two or more series of transverse spring-leaves with edges abutting in each series but overlapped by spring-leaves of another series, each spring-leaf being provided with a recurvature in its middle portion such as to enable it to clasp firmly-abutting springs of overlapping series and form a flexible, sectional, puncture-proof tread-band, substantially as described.

53. A series of transverse spring-leaves provided with a recurvature in their middle portion such as to allow edges of adjacent springs to abut along such recurvature but, owing to a lesser width at such abutting recurved middle portion of each spring-leaf, the remaining shouldered portions are caused to overlap edges of adjacent spring-leaves forming a flexible sectional puncture-proof tread-band, substantially as shown and described.

54. Spring-leaves having a recurved recess at their middle convex, or concave, portion capable of clasping the tongue of a tread-band, or rim-band, which recurved middle portion is of lesser width than the remaining shouldered portion to permit edges of adjacent leaves of a series to abut at middle recurved portion but overlap at remaining shouldered portion, substantially as shown and described.

55. Spring-leaves having a recurved recess at their middle concave portion capable of clasping the tongue of a rim-band to firmly attach themselves thereto, substantially as shown and described.

56. Spring-leaves having a recurved recess at their middle convex portion capable of clasping the tongue of a tread-band to firmly attach themselves thereto and of clasping one another to form a flexible band of one or more series of spring-leaves, substantially as shown and described.

57. Spring-leaves having a recess at their middle convex or concave portion, which recessed middle portion is of lesser width than shouldered remaining portion to permit edges of adjacent leaves of a series to abut at middle recessed portion but overlap at remaining shouldered portion, substantially as shown and described.

58. A flexible cover, for a tubular spring or other tire, of unbroken transverse contour provided with an outwardly-projecting longitudinally-extending tongue at its outer rim-circumference having a recurved recess at its inner rim-circumference with its throat narrower than interior of recess caused by a thickening of material of said tongue enabling it to clasp a correspondingly-recurved rim band or tongue of tire at rim and act as a packing between tire and rim of wheel, substantially as shown and described.

59. A sectional cover, for a tubular spring or other tire, provided with an outwardly-projecting longitudinally-extending tongue at its outer rim-circumference having a recurved recess at its inner rim-circumference with its throat narrower than interior of recess caused by a thickening of material of said tongue enabling it to clasp a correspondingly-recurved rim band or tongue at rim of said tire and act as a packing between tire and rim of wheel, substantially as shown and described.

60. A longitudinal section of a cover, for a tubular spring or other tire, provided with an outwardly-projecting longitudinal tongue at its outer rim-circumference having a recurved recess at its inner rim-circumference enabling it to clasp a correspondingly-recurved tongue at rim of said tire and act as a packing between tire and rim of wheel; which section may be divided longitudinally at its middle portion if desired, substantially as shown and described.

61. A flexible cover, for a tubular spring or other tire, provided with an outwardly-projecting longitudinally-extending tongue at its outer rim-circumference having a recurved recess at its inner rim-circumference with its throat narrower than interior of recess caused by a thickening of material of said tongue enabling it to clasp a correspondingly-recurved rim band or tongue of tire at rim and act as a packing between tire and rim of wheel, said tongue being divided longitudinally through its center to produce a cover open at rim, substantially as shown and described.

62. A flexible cover, for a tubular spring or other tire, provided with a recurved inwardly-projecting longitudinal tongue at inner tread-circumference divided longitudinally through said tongue to produce a cover open at tread, substantially as shown and described.

63. In a sectional cover, for a tubular spring or other tire, provided with an inwardly-projecting longitudinal tongue at its inner tread-circumference with recurved sides caused by a thickening of its solid material along its inner or lesser longitudinal periphery, and an outwardly-projecting longitudinally-extending tongue at its outer rim-circumference having a recurved recess at its inner rim-circumference with its throat narrower than interior of recess caused by a thickening of material of said tongue enabling it to clasp a correspondingly-recurved tongue of a tire and act as a packing between tire and rim of wheel, a section forming a longitudinal half of said cover, substantially as shown and described.

64. A detachable bevel-gear device for closing the ends of a tire, or other purpose, consisting of a boxing inclosed within which are geared three bevel-gear-headed shafts, two of which pass through opposite sides of boxing which furnishes a bearing for their bevel-gear heads; the external portion of each of the two separate shafts is threaded the same; the third bevel-gear has a solid or hollow shaft that, passing through an intervening side of the boxing, is provided with a thumb-piece or wrench which revolves the bevel-gear-headed screws, and will cause nuts, or other similarly-threaded objects, engaged one on each of said bevel-gear-headed screws to simultaneously approach toward, or recede from, the boxing; together with a loose bevel-gear placed opposite the thumb-shaft to steady the other geared shafts, substantially as described.

65. A bevel-gear device for closing the ends of a tire, or other purpose, consisting of a boxing inclosed within which, and completely housed by it, are geared two bevel-gear-headed shafts passing through adjacent sides of boxing which furnishes a bearing for their bevel-gear heads; the external portion of one of the shafts is threaded, the other solid or hollow shaft is provided with a thumb-piece or wrench which revolves the bevel-gearing and will cause a nut or other similarly-threaded object engaged on said bevel-gear-headed screw to approach toward, or recede from, the boxing, together with a loose bevel-gear placed opposite the thumb-shaft to steady the other geared shafts, substantially as described.

66. A detachable bevel-gear device for closing the ends of a tire, or other purpose, consisting of a boxing inclosed within which are geared three bevel-gear-headed shafts, two of which pass through opposite sides of boxing which furnishes a bearing for their bevel-gear heads; the external portion of each of the two separate shafts is threaded the same; the third bevel-gear has a solid or hollow shaft that, passing through an intervening side of the boxing, is provided with a thumb-piece or wrench which revolves the bevel-gear-headed screws, and will cause nuts or other similarly-threaded objects, engaged one on each of said bevel-gear-headed screws to simultaneously approach toward, or recede from, the boxing; said boxing being provided with oppositely and laterally projecting and longitudinally-extending flanges, substantially as described.

67. A flexible outer cover for a tubular-spring-tire or pneumatic-tire tube with ends, having the same outer periphery, provided with inwardly-projecting and transversely-extending shoulders forming flanges adapted to abut continuously together, and a projecting band of flexible material attached to or made integral with one end of cover to form a telescoping band over which the ends of tire-cover abut, substantially as described.

68. A flexible outer cover for a tubular-spring-tire or pneumatic-tire tube with ends, having the same outer periphery, provided with inwardly-projecting and transversely-extending shoulders forming flanges adapted to abut continuously together, having embedded in, or made integral with, each of said ends a transverse band of suitable non-stretching material together with a projecting band of flexible material attached to or made integral with one end of cover to form a telescoping band over which the ends of tire-cover abut, substantially as described.

69. A detachable tubular-tire or pneumatic-tire cover, of canvas or other suitable material, continuously open at rim with free ends adapted to abut together over a telescoping flexible band attached to or made an integral part of one end, substantially as described.

70. A detachable tubular-tire, or pneumatic-tire cover, of canvas or other suitable material, continuously open at rim, with free ends adapted to abut together over a telescoping flexible band attached to or made an integral part of one end, and provided with suitable means for adjustably attaching and securing together the edges at approximate ends, and the ends at approximate edges, of said tire, substantially as described.

71. A detachable tubular-tire, or pneumatic-tire cover, of canvas or other suitable material, continuously open at rim, with free ends adapted to abut together, and provided with a flexible open band at each approximate rim edge, substantially as described.

72. A detachable tubular-tire, or pneumatic-tire cover, of canvas or other suitable material, continuously open at rim, with free ends adapted to abut together, and provided with a reinforcement of material with a flexible open band at approximate edges and ends, substantially as described.

73. In combination with a tubular-tire, or pneumatic-tire cover, having free ends adapted to abut together, one or more detachable rim-bands provided with means for regulating the amount of compression of material of tire or cover along said rim band or bands to secure an impact of material at tread on the complete transverse abutting contact of ends, substantially as described.

74. In combination with a tubular-tire, or pneumatic-tire cover, having free ends, one or more detachable rim-bands made attachable by adjustably securing ends of bands to ends of tire or cover to allow independent longitudinal movement of band and provided with means for regulating the amount of compression of material of tire or cover along said rim band or bands to secure a longitudinal impact or compression of material at tread on the inflation of tire or cover, substantially as described.

75. The combination of a tire or pneumatic-tire cover, having free ends, with a detachable rim-retaining band provided with an adjusting end plate at each end and each end plate, secured to an end of tire or cover, by acting as a sleeve being adapted to regulate the length of tire or cover at rim by being forced toward or away from the other along the said retaining-band together with means for securing said end plate to said retaining-band when the tire is detached from the wheel-rim and its ends are disengaged, substantially as shown and described.

76. The combination of a tire or pneumatic-tire cover, having free ends and continuously open at rim, with two independently-acting detachable rim-retaining bands, one within each rim edge, provided with an adjusting end plate at each end of said bands and each end plate, secured to an end of tire or cover at its rim edge, by acting as a sleeve being adapted to regulate the length of the tire or cover at its rim by being forced toward, or away from, the other along the same retaining-band when the tire is detached from the wheel-rim and its ends are disengaged, together with a detachable nut or block at each end of tire securing together laterally the end plates of each end of tire or cover, substantially as shown and described.

77. In an open tire having free ends, the combination of a detachable nut or block with two laterally-placed adjusting end plates; the nut or block being provided with lateral flanges and made attachable to each end plate by dovetailing, substantially as shown and described.

78. In a pneumatic tire, the combination of an outer cover, of canvas or other suitable material, provided with free ends and one or more detachable rim-retaining bands made attachable by adjustably securing ends of band to ends of cover to allow independent longitudinal movement of band, substantially as shown and described.

79. In combination with a tubular-tire, or pneumatic-tire cover, provided with free ends, a transverse flexible band, preferably open at rim, over which the free ends of tire or cover are adapted to abut, substantially as described.

HENRY C. SHEARMAN.

Witnesses:
SOCRATES SCHOLFIELD,
WELCOME A. GREENE.